United States Patent [19]
Ichikawa

[11] 3,883,584
[45] May 13, 1975

[54] PROCESS FOR THE PREPARATION OF TEREPHTHALIC ACID
[75] Inventor: Yataro Ichikawa, Iwakuni, Japan
[73] Assignee: Teijin Ltd., Osaka, Japan
[22] Filed: Nov. 17, 1972
[21] Appl. No.: 307,394

[30] Foreign Application Priority Data
Nov. 25, 1971 Japan.............................. 46-94664
Oct. 11, 1972 Japan............................ 47-101099

[52] U.S. Cl............................ 260/524 A; 260/525
[51] Int. Cl....................... C07c 63/02; C07c 63/26
[58] Field of Search........................ 260/524 R, 525

[56] References Cited
UNITED STATES PATENTS
2,833,816   5/1958   Saffer et al. ......................... 260/524
3,334,135   8/1967   Ichikawa............................. 260/524
3,711,539   1/1973   Koch et al. .......................... 260/525

FOREIGN PATENTS OR APPLICATIONS
1,234,009   6/1971   United Kingdom................. 260/525

OTHER PUBLICATIONS
Ohta et al., Kogyo Kagaker Fasshi vol. 63 pp. 768-773 (1960), cited by applicant.

Primary Examiner—Lorraine A. Weinberger
Assistant Examiner—Richard D. Kelly
Attorney, Agent, or Firm—Sherman & Shalloway

[57] ABSTRACT

Terephthalic acid is prepared by oxidizing paraxylene and/or paratoluic acid with a molecular oxygen-containing gas in the liquid phase at 150°–220°C. in the substantial absence of a lower fatty acid or halogen compound and in the presence of a cobalt compound and a manganese compound, which are at least partially soluble in the reaction mixture, the sum total of cobalt and manganese calculated as metals, present in the total oxidation reaction mixture being in the amount of 0.005–0.5 percent by weight, the weight ratio, calculated as metals, of the cobalt and manganese being 99.8 : 2–20:80.

13 Claims, No Drawings

PROCESS FOR THE PREPARATION OF TEREPHTHALIC ACID

This invention relates to a process for the preparation of terephthalic acid (TA) by oxidizing paraxylene (PX) and/or paratoluic acid (PTA) with molecular oxygen in the liquid phase, and particularly to a process which is characterized in that the oxidation is carried out in the substantial absence of a lower fatty acid as an oxidation solvent or a halogen compound as an accelerator but by using both a cobalt compound and a manganese compound as the oxidation catalyst.

Terephthalic acid is a compound useful as the starting material for the production of fiber and film-forming polyesters and is being produced in great quantities on a commercial scale.

Numerous methods of producing terephthalic acid by the oxidation of paraxylene or paratoluic acid with molecular oxygen are already known, but all of these known methods have major shortcomings.

For instance, in the case of preparing terephthalic acid by oxidizing paraxylene or paratoluic acid with molecular oxygen in a lower fatty acid solvent such as acetic acid in the presence of a heavy metal catalyst and a bromine compound accelerator (U.S. Pat. No. 2,833,816), the corrosion of the equipment by the bromine compound is pronounced. Hence, the equipment must be made of costly materials such as titanium and, in addition, the useful life of the equipment is short. Again, in the method wherein the oxidation is carried out at a relatively low temperature in a lower fatty acid solvent such as acetic acid by using a cobalt compound catalyst and an accelerator such as methyl ethyl ketone or acetaldehyde (U.S. Pat. Nos. 3,036,122 and 2,673,217), there is the undesirability in that methyl ethyl ketone and acetaldehyde are consumed.

On the other hand, while there is also a method of producing terephthalic acid from paraxylene or paratoluic acid at below 150°C. in an acetic acid solvent by using a cobalt compound catalyst in an exceedingly great amount but without using an accelerator (U.S. Pat. No. 3,334,135), in this case the reaction speed is relatively low and moreover there is the necessity of using the cobalt compound in a great amount.

The hereinabove-described methods are in all cases those in which a lower fatty acid such as acetic acid is used in large amounts. Hence, inconvenience is involved in respect of the management thereof. Not only is the amount produced of terephthalic acid per unit volume of the oxidation apparatus small, but also there is matter of corrosion of the apparatus by the acetic acid, as well as the problem of the loss resulting from the decomposition of the acetic acid during the oxidation reaction.

The method of preparing terephthalic acid from paraxylene disclosed in British Patent Specification No. 1,234,009 is believed to excel the aforementioned methods in the point that neither a lower fatty acid solvent nor an accelerator is used. However, as a result of my investigations, it was found that the rate of formation of the intended terephthalic acid by this method was low and, in addition, that there was formation in great quantities of numerous by-products such as carbon dioxide, carbon monoxide and high boiling tarry substances, with the consequence that the selectivity for terephthalic acid from paraxylene was low. Further, the discoloration of the oxidation product was pronounced. In consequence, the terephthalic acid obtained by washing the oxidation product by the procedure indicated in said British patent specification was also discolored to a considerable degree. Since the color of a polyester prepared by using discolored terephthalic acid is poor, the terephthalic acid used in preparing fibers or films must be one whose purity is good. The terephthalic acid obtained by the method of the foregoing British patent must undergo very complicated purification procedures before it can be used as the starting material for the preparation of polyesters.

The object of the present invention is to provide a process which can prepare terephthalic acid not only at a high reaction speed but also at a high selectivity and low degree of discoloration by using paraxylene and/or paratoluic acid as the starting material and conducting the oxidation thereof with molecular oxygen without using a lower fatty acid solvent and a halogen compound accelerator.

The foregoing object of this invention is achieved by carrying out said oxidation reaction in the process for preparing terephthalic acid by the oxidation of paraxylene and/or paratoluic acid with a molecular oxygen-containing gas in the liquid phase, 1. in the substantial absence of a lower fatty acid or a halogen compound, 2. in the presence of a cobalt compound and a manganese compound, which are at least partially soluble in the reaction mixture, the sum total of cobalt and manganese calculated as metals, present in the total oxidation reaction mixture being in the amount of 0.005–0.5 percent by weight, and the weight ratio, calculated as metals, of the cobalt and manganese being 99.8:0.2–20:80; and 3. at a temperature in the range of 150°–220°C.

The foregoing British Patent Specification No. 1,234,009 discloses that in preparing terephthalic acid from paraxylene in the absence of a lower fatty acid or an accelerator numerous heavy metals can be used as the oxidation catalyst, and that especially to be preferred is cobalt, the sole specific example given being cobalt naphthenate.

According to my investigations, of the heavy metals given in Lang's *Handbook of Chemistry*, 9th Edition (1956), pp. 56–57 that is mentioned in the aforesaid British Patent Specification No. 1,234,009, the chromium and nickel compounds, when used as catalyst, do not give desirable results. Again, it was found that even though these compounds were used conjointly with the cobalt compounds, the results obtained were not as satisfactory as the case where the cobalt compounds were used alone.

As regards the catalytic activity of the cobalt and manganese compounds in the oxidation of paraxylene in the absence of a lower fatty acid or a halogen compound, Ohta et al. have made some investigations into this matter, and they report that, "On the oxidation of paraxylene, soluble Mn salts and soluble Co salts acted as catalysts, but the mixture of Mn and Co salts had no catalytic activity." [*Kogyo Kagaku Zasshi* Vol. 63, pp. 768–773 (1960) and the *Chemical Abstracts*, Vol. 56 p. 8620].

On the other hand, in accordance with my studies, when a manganese compound is used singly as catalyst in the nonsolvent oxidation of paraxylene at, say, 145°C., the reaction speed was exceedingly low as compared with the instance where a cobalt compound is used alone, and there is practically no formation of terephthalic acid. Further, in the foregoing 145°C. oxidation reaction, even though the manganese compound is used conjointly with the cobalt compound, there is a drop in the speed of formation of terephthalic acid, as compared with the case where the cobalt compound is used alone. Moreover, there is extreme discoloration of the oxidation product.

While there are some differences as to temperature and other conditions between the experiment (135°C.) of Ohta et al. and that (145°C.) of mine, and hence there is a difference in the results obtained, there is an agreement in the point that it is undesirable to use the cobalt and manganese compounds as a mixture.

However, when I furthered my researches, it was found surprisingly that manganese which did not demonstrate hardly any catalytic activity at 145°C., would demonstrate by itself a strong catalytic activity at elevated temperatures such as, say, 170°-200°C. and that it would, depending upon the conditions, provide desirable results comparable to those of cobalt. A further surprising fact was the discovery that, in contrast to the fact that desirable results could not be obtained by the conjoint use of the cobalt and manganese compounds at temperatures less than 150°C., at temperatures above 150°C. the conjoint use of the cobalt and manganese compounds in carrying out the oxidation of paraxylene and/or paratoluic acid in the absence of a lower fatty acid solvent or a halogen compound accelerator would yield results that are much more excellent than the case where these compounds are each used separately.

When the cobalt and manganese compounds are conjointly used in the present invention as catalyst, it becomes possible to prepare at a temperature of 150°-220°C., and especially conveniently at a temperature in the range of 160°-200°C., terephthalic acid at a very high reaction speed and high selectivity with a minimum content of impurities which discolor the product.

When the reaction temperature falls less than 150°C., not only does the speed of formation of terephthalic acid drop greatly but there is also the likelihood of the oxidation product, and especially the terephthalic acid, separating out inside the oxidation reaction apparatus, with the consequence that clogging of the port from which the molecular oxygen is blown in and the port from which the oxidation reaction product is withdrawn take place. Hence, there is the possibility that the operation cannot be carried out stably. On the other hand, when the reaction temperature exceeds 220°C., undesirable effects are had in that not only the speed of formation of terephthalic acid and selectivity therefor drop greatly, but also a great increase takes place in the formation of by-product impurities which discolor the product.

In the present invention the cobalt and manganese compounds are used as catalyst combined so that the composition of the foregoing compounds, calculated as respectively cobalt and manganese metals, is a weight ratio of cobalt to manganese of 99.8:0.2-20:80, and preferably 99.5:0.5-50:50.

The reason therefor is that when the amount of the manganese becomes less than the weight ratio of cobalt to manganese, calculated as the cobalt and manganese metals, of 99.8:0.2, the speed of formation of terephthalic acid becomes small, the discoloration of the oxidation reaction mixture is aggravated, and an abrupt increase takes place in such decomposition products as carbon dioxide, carbon monoxide and the high boiling tarry substances which cause discoloration of the oxidation reaction mixture. In conseqnence, the selectivity of the reaction suffers extremely.

On the other hand, when the amount of the manganese exceeds the weight ratio of cobalt to manganese of 20:80, there likewise are such undesirable results as an increase in the discoloration of the oxidation reaction mixture, a decline in the selectivity of the reaction and also a great slowing down of the speed of formation of the terephthalic acid.

Further, it is an advantage in this invention that, along with the use of the composition of the cobalt and manganese compounds in range indicated above, the two compounds are used in such amounts that, calculated as cobalt and manganese metals, the concentration of these metals in the total oxidation reaction mixture is 0.005-0.5 percent, and preferably 0.007-0.2 percent by weight. The reason therefor is that when the catalyst concentration becomes less than the foregoing amount, it is not desirable, because the speed of formation of terephthalic acid and the selectivity therefor decline and the by-product impurities which cause discoloration of the product increase. On the other hand, when the catalyst concentration exceeds the foregoing range, the speed of formation of and selectivity for terephthalic acid decline. Further, since the amount used of the catalyst increase, it is also economically undesirable.

As these cobalt and manganese compounds, which are used as catalyst in the foregoing proportion in the present invention, any which is at least partially soluble in the reaction mixture will do. Even if these compounds are those which are in themselves difficultly soluble or insoluble in the reaction mixture, so long as they are capable of changing in the reaction mixture to soluble compounds, or at least those which are partially soluble, they can be used. Especially, in the case where the oxidation reaction is carried out continuously in a single vessel while thoroughly mixing the components, the change to the soluble state takes place rapidly because of the high concentration of the aromatic carboxylic acids such as paratoluic acid in the oxidation reaction mixture. Hence, even though the compound is in itself insoluble, it can be used relatively easily. On the other hand, when the reaction is carried out batchwise using paraxylene as the starting material, the addition of a small quantity of paratoluic acid to the paraxylene increases the solubility of the cobalt and manganese compounds or accelerates their change to the soluble state. Hence, the induction period of the oxidation reaction is shortened by this desirable addition of the paratoluic acid.

As the cobalt and manganese compounds to be used in the present invention, mention can be made of such, for example, as the following:

1. the cobalt and manganese salts of aliphatic carboxylic acids of 1-20 carbon atoms such, for example, as formic, acetic, propionic, butyric, stearic, palmitic, oleic, linoleic, adipic and decanedicarboxylic acids;

2. the cobalt and manganese salts of aromatic carboxylic acids of 7-20 carbon atoms such, for example, as benzoic, toluic, isophthalic and terephthalic acids;

3. the cobalt and manganese salts of alicyclic carboxylic acids of 5-20 carbon atoms such, for example, as naphthenic, cylohexanecarboxylic and methylcyclohexanecarboxylic acids;

4. the complex salts such as acetylacetonates, methylacetoacetates and etehylacetoacetates of cobalt and manganese; and 5. the metals or the various inorganic compounds such as metallic cobalt, metallic manganese, and the carbonates, oxides and hydroxides of cobalt and manganese.

While preferred examples of the cobalt compounds (inclusive of metallic cobalt) and the manganese compounds (inclusive of metallic manganese) that can be used as catalyst components in the present invention have been given above, the cobalt and manganese compounds usable in the invention are by no means limited to those presented above, but any of the cobalt and manganese compounds that are at least partially soluble in the oxidation reaction mixture of the invention are usable.

Of these compounds, especially preferred are the acetates, benzoates, toluates and naphthenates of cobalt and manganese. These are not only all readily available but also are all readily soluble in the reaction mixture.

The oxidation of paraxylene and/or paratoluic acid in the invention is carried out in the absence of a lower fatty acid as a solvent, and preferably without the use of a solvent. Again, it is preferred that the oxidation reaction be carried out while controlling the content of the terephthalic acid, the intended product, such that it does not exceed 60 percent by weight, and preferably 45 percent by weight, of the reaction mixture. If the reaction is carried out to the point where the content of the terephthalic acid in the oxidation reaction mixture exceeds 45 percent, especially 60 percent by weight, it becomes difficult to handle the oxidation reaction mixture as a slurry, and hence the operations of the reaction is adversely affected. However, the oxidation reaction is best carried out to the point where the content of terephthalic acid exceeds 10 percent, and preferably 15 percent by weight; otherwise the amount produced of the terephthalic acid would be small and it would not be economical.

In the oxidation reaction mixture obtained by the invention process there are contained other than terephthalic acid, the intended product, a considerably large amount of unreacted starting material, intermediates by-products and diluents other than lower fatty acids that are, at times, used.

For instance, when the oxidation reaction is carried out in the absence of a solvent, the oxidation reaction mixture contains in addition to the intended terephthalic acid and the unreacted paraxylene and paratoluic acid, such intermediates as paratolualdehyde, paraformylobenzoic acid and paramethylbenzyl alcohol and such by products as high boiling tarry substances.

Accordingly, it is preferred in this invention that the intended terephthalic acid be separated and recovered from the oxidation reaction mixture followed, if necessary, by its purification, while the unreacted starting material and the intermediates other than terephthalic acid be recycled to the oxidation reaction step.

In the separation of this terephthalic acid, the various heretofore known techniques can be used, but since a lower fatty acid solvent is not used, the separation of the terephthalic acid from the oxidation reaction mixture is relatively difficult. For instance, according to British Patent Specification No. 623,836, the purity of the terephthalic acid obtained from the oxidation reaction mixture by only a solid-liquid separation step is only 77 percent, and even that obtained by washing this for 12 hours in a 30-fold amount of methanol followed by separation by filtration is only 91 percent. Further, while it is suggested in British Patent Specification No. 1,234,009 to wash the oxidation reaction product with paraxylene at above 250°C., and preferably 290°–300°C., in view of the very high vapor pressure of paraxylene and hence the necessity of carrying out the operation at an exceedingly high pressure for maintaining a major portion of the paraxylene in the liquid phase during the washing operation, this operation requires the use of an expensive pressure vessel. In addition, there is the drawback that a treatment at such elevated temperatures causes discoloration of the terephthalic acid.

In consequence of extensive researches into the methods of commercially advantageously separating the terephthalic acid from the oxidation reaction mixture obtained by the oxidation reaction of the present invention, at a high purity and a minimum of discoloration, as well as methods of returning the unreacted material and intermediates other than the terephthalic acid to the oxidation step, I found that if the solid-liquid separation is carried out after the oxidation reaction mixture is held at an elevated temperature exceeding 220°C. (elevated temperature treatment) the particles of the terephthalic acid become large during this heat treatment and the impurities contained in the particles decrease to make for ease of operation of the solid-liquid separation step, and at the same time there is also a marked improvement of the purity of the resulting terephthalic acid.

When the temperature of this elevated temperature treatment is not exceeding 220°C., not only is difficulty experienced in the solid-liquid separation, but the purity of the resulting terephthalic acid is low as well. Since the time this elevated temperature is maintained is shortened as the treatment temperature is raised and the results are more satisfying, it is preferred that the treatment be carried out at above 230°C. On the other hand, if the treatment is too high, the discoloration of the terephthalic acid becomes excessive. So a temperature not exceeding 270°C., and especially not in excess of 260°C., is to be preferred.

This elevated temperature treatment can be carried out, say, in the oxidation reactor in situ after stopping the blowing in of the air and completion of the oxidation reaction, or it can be carried out after the reaction mixture has been transferred to another vessel.

Although the whole of the oxidation reaction mixture may be submitted to the elevated temperature treatment as obtained, the treatment can be advantageously carried out at a lower pressure when the reaction mixture is submitted to the elevated temperature treatment after the low boiling components such as unreacted paraxylene are first distilled off. Again, while the distillation and removal of these low boiling components can be carried out separately, it can also be achieved by removal externally of the low boiling components that distill off during the initial stages of the elevated temperature treatment step.

The treatment time of the elevated temperature treatment, i. e., the period of time during which the oxidation reaction mixture is held at the elevated temperature, is from 10 minutes to 50 hours, and preferably 30 minutes to 10 hours, although varying depending upon the temperature and other conditions. When the treatment time is too short, fully satisfactory results cannot be obtained. On the other hand, when the treatment time is too long, not only is it a disadvantage economically, but also the discoloration of the terephthalic acid increases.

The treatment temperature need not necessarily be maintained constant, but rather the effects of the elevated temperature treatment are promoted by raising or lowering the temperature cyclically between, say, 240° and 250°C. Again, the effects of the elevated temperature treatment are also promoted either by stirring the oxidation reaction mixture mechanically or by stirring the mixture by blowing in an inert gas such as nitrogen during the treatment.

After completion of the elevated temperature treatment, the solid terephthalic acid is isolated from the oxidation product. In carrying out the isolation of the terephthalic acid, the various conventional solid-liquid separation methods such as filtration, centrifugation, etc., can be employed. The solid-liquid separation may be carried out at the temperature at which the elevated temperature treatment was carried out or it may be carried out after cooling the reaction product to an extent as will not impair its fluidity. Again, the solid-liquid separation may be carried out after first admixing a solvent such as benzene, toluene, xylene, methanol or ethanol with the elevated temperature-treated reaction product. When a solvent has been used in this manner, the liquid side, before being returned to the oxidation step, is best removed of a major portion of its solvent by such means as distillation. The use of paraxylene as the solvent is to be preferred commercially. for instance, the procedure of mixing paraxylene with the elevated temperature-treated oxidation reaction mixture to cool and dilute it followed by carrying out the solid-liquid separation step is a practically desirable method. The terephthalic acid obtained by the solid-liquid separation may then be further washed in a solvent, say, paraxylene. When the oxidation product (reaction mixture) is submitted to its solid-liquid separation in the manner described hereinabove under properly selected conditions, white terephthalic acid crystals more than having 99 percent are readily obtained and, at the same time, the unreacted starting material and intermediates contained in the oxidation product are recovered in the liquid side and are readily recycled to the oxidation step of the present invention.

The so obtained terephthalic acid is fully satisfactory for the use in, say, the manufacture of the alkyd resins or the synthesis of bis-beta-hydroxyethylterephthalate by reacting it with ethylene oxide.

On the other hand, the unreacted starting material and intermediates recovered on the liquid side are, as a result of being recycled to the oxidation step, eventually oxidized to terephthalic acid. Hence, in consequence of carrying out the recycling operation in this manner, there is no loss of the intermediates. Further, when the oxidation reaction is carried out by the batch method, the induction period is shortened by the presence of a small quantity of paratolualdehyde in addition to the starting paraxylene. Hence, the recycling of paratolualdehyde, an intermediate, is desirable from this angle also.

While the hereinbefore-described procedures need not necessarily be employed in isolating the terephthalic acid from the oxidation reaction mixture and in returning the unreacted starting material and oxidation intermediates to the oxidation step, it is highly advantageous to employ the aforesaid method consisting of performing the solid-liquid separation after the elevated temperature treatment.

The oxidation reaction of the invention is preferably carried out in the absence of a solvent. However, for simplifying the handling of the oxidation product as a slurry, the oxidation reaction may be carried out in the presence of a diluent that is stable under the oxidation conditions obtaining, such, for example, as benzene, biphenyl and methyl benzoate.

The halogens and halogen compounds such as bromine or bromine compound, which are known as being accelerators in carrying out the oxidation of the alkyl-substituted aromatic compounds, or the lower fatty acids such, for example, as acetic acid, acetic anhydride, propionic acid and monochloroacetic acid, which likewise are known as being solvents in carrying out the foregoing oxidation reaction, are not used in the present invention.

The foregoing halogens and halogen compounds have the property of greatly corroding the reactor. Further, the impurities resulting from the halogen compounds make for difficulty in purifying the terephthalic acid. The lower fatty acid solvents also corrode the apparatus at the reaction temperatures of the invention. In addition, there is their loss through decomposition during the oxidation reaction, and hence the economic loss is also great. Thus it is unnecessary and in fact not desirable to use the halogen compounds as an accelerator and/or the lower fatty acids as a solvent in the present invention.

The oxidation reaction of the invention is carried out by holding the starting paraxylene and/or paratoluic acid in substantially a liquid phase and, the reaction product, especially terephthalic acid, is suspended in the liquid phase. In general, the oxidation reaction of the invention can be carried out at a total pressure is the range of normal atmospheric pressure to 250 $kg/cm^2$ and a partial pressure of the molecular oxygen in the range of 0.2–50 $kg/cm^2$. When the partial pressure of molecular oxygen is reduced to below 0.2 $kg/cm^2$, the speed of formation of terephthalic acid is reduced. On the other hand, it is undesirable for the total pressure to exceed 250 $kg/cm^2$, since the cost of equipment becomes excessive. A desirable pressure is a partial pressure of the molecular oxygen in the range of 0.4–6 $kg/cm^2$.

The molecular oxygen-containing gas used in the present invention as the oxidant includes pure oxygen, air whose oxygen concentration has been raised, or the gaseous mixture of oxygen and an inert gas, say, carbon dioxide and nitrogen, or air. However, of these, air is the most economical and hence desirable. These gases are contacted with the reaction mixture by such procedures as blowing into the reaction mixture, which is in the liquid phase.

Again, it is preferred that the oxidation reaction mixture be stirred by a suitable method such, for example, as a forced mechanical agitation or by effecting the agitation by the blowing in of the gas such as a molecular oxygen-containing gas or a combination of these methods or by a combination with other optional methods.

The water formed during the oxidation of the invention may be separated by a suitable method, or it may be recycled to the reaction system by means of, say, a reflux condenser. However, it is preferably removed from the reaction system by a suitable method.

The aforesaid oxidation reaction of the invention can be carried out either continuously or batchwise.

Thus, as hereinbefore described, the present invention possesses very excellent advantages in that by operating in accordance therewith and using as catalyst both the cobalt and manganese compounds in a specific proportion and without using the lower fatty acid solvent or an accelerator such as the halogen compounds, it is possible to obtain terephthalic acid at a high rate of selectivity and fast reaction speed and moreover with the degree of discoloration of the resulting terephthalic acid being small.

The following examples will be given for more fully illustrating the invention.

reaction mixture was withdrawn, and its weight and the content of terephthalic acid were determined. The speed of formation of terephthalic acid was then calculated as follows:

Speed of formation of TA =

$$\frac{\text{Weight (g) of reaction mixture withdrawn} \times \text{TA content (wt\%)}}{\text{Reaction time (hr)} \times 100}$$

Further, the carbon dioxide and carbon monoxide in the spent gas were analyzed, and the rate of decomposition loss was calculated as follows:

Rate of decomposition loss =

$$\frac{\text{Carbon dioxide (mmol)} + \text{Carbon monoxide (mmol)}}{\text{Weight (g) of TA formed}}$$

Further, for comparing the amount of discoloring impurities, one gram of the oxidation mixture was dissolved in 40 cc of dimethylformamide, and this was placed in a color comparison tube and the Hazen number (American Public Health Association Number) was determined.

TABLE 1

| Run | Amount of catalyst added Co (mg) | Mn (mg) | Decomposition loss (mmol/g) | Degree of discoloration (Hazen number) | Speed of TA formation (g/hr) | Remarks |
|---|---|---|---|---|---|---|
| 1-a | 50 | 0 | 60.45 | 500 | 1.7 | Comparison |
| 1-b | 49.90 | 0.10 | 9.10 | 300 | 9.2 | Example |
| 1-c | 49.75 | 0.25 | 4.08 | 250 | 15.1 | do. |
| 1-d | 47.5 | 2.5 | 3.48 | 150 | 14.6 | do. |
| 1-e | 37.5 | 12.5 | 3.66 | 120 | 13.1 | do. |
| 1-f | 25 | 25 | 5.82 | 250 | 11.3 | do. |
| 1-g | 10 | 40 | 7.23 | 300 | 9.5 | do. |
| 1-h | 2.5 | 47.5 | 13.42 | 450 | 3.2 | comparison |
| 1-i | 0 | 50 | 33.91 | 500 | 1.5 | do. |

EXAMPLE 1

A 500-cc titanium autoclave equipped with a reflux condenser, a stirrer and a gas blowing-in inlet was charged with 200 grams of paraxylene and 5 grams paratoluic acid, after which cobalt acetate and manganese acetate containing Co and Mn in a proportion indicated in the following Table 1 were added. This was followed by blowing in air at a temperature of 180°C. and a pressure of 15 kg/cm² gauge such that the rate of flow of air at the outlet would be 1500 cc/min., while agitating the reactants at high speed, the reaction being carried out for 3 hours after the absorption of oxygen started. After completion of the reaction, the oxidation

EXAMPLE 2

The same autoclave as that used in Example 1 was charged with 200 grams of paraxylene, 5 grams of paratoluic acid, and cobalt acetate containing 47.5 milligrams of Co and manganese acetate containing 2.5 milligrams of Mn. The reaction was carried out as in Example 1 but varying the reaction temperature, reaction pressure, rate of gas flow at the outlet and the reaction time. The rate of decomposition loss, the degree of discoloration and the speed of formation of TA were then determined as in Example 1. The conditions of the experiments and the results obtained are shown in Table 2.

Table 2

| Run | Temperature (°C.) | Pressure (Kg/cm²G) | Rate of gas flow (cc/min) | Reaction time (hr) | Decomposition loss (mmol/g) | Degree of discoloration (Hazen number) | Speed of TA formation (g/hr) | Remarks |
|---|---|---|---|---|---|---|---|---|
| 2-a | 150 | 15 | 1,500 | 3.0 | 4.61 | 120 | 9.6 | Example |
| 2-b | 160 | 15 | 1,500 | 3.0 | 2.18 | 100 | 16.3 | do. |
| 2-c | 170 | 15 | 1,500 | 3.0 | 2.52 | 90 | 14.4 | do. |
| 2-b | 180 | 15 | 1,500 | 3.0 | 2.44 | 120 | 17.0 | do. |
| 2-e | 180 | 20 | 1,500 | 3.0 | 3.79 | 200 | 13.7 | do. |
| 2-f | 180 | 30 | 1,500 | 3.0 | 4.16 | 200 | 12.8 | do. |
| 2-g | 190 | 15 | 1,500 | 3.0 | 4.15 | 250 | 14.3 | do. |
| 2-h | 190 | 15 | 1,800 | 2.5 | 4.07 | 270 | 18.1 | do. |
| 2-i | 190 | 15 | 2,250 | 2.0 | 4.18 | 200 | 22.9 | do. |
| 2-j | 200 | 15 | 1,500 | 3.0 | 4.20 | 270 | 15.3 | do. |
| 2-k | 220 | 15 | 1,500 | 3.0 | 7.11 | 350 | 14.9 | do. |
| 2-l | 240 | 15 | 1,500 | 3.0 | 18.19 | above 500 | 3.0 | Comparison |

EXAMPLE 3 (Comparison)

The same autoclave as that used in Example 1 was charged with 200 grams of paraxylene, 5 grams of paratoluic acid and either cobalt acetate or manganese acetate containing 50 milligrams of respectively Co or Mn, after which the reaction was carried out for 3 hours at a pressure of 15 kg/cm² gauge by blowing in air such that the rate of flow of the air at the outlet would be 1500 cc/min., while stirring the reactants at high speed. The temperature was varied as indicated in Table 3 in carrying out the several runs. The decomposition loss, the degree of discoloration and the speed of TA formation were then calculated as in Example 1. The conditions and the results obtained are shown in Table 3.

EXAMPLE 5

A stainless steel autoclave of the same type as that used in Example 1 was charged with 200 grams of paraxylene, 5 grams of paratoluic acid, 1 gram of paratolualdehyde, and cobalt and manganese acetates containing Co and Mn in respectively the amounts indicated in Table 5, following which the reaction was carried out for 3 hours at a temperature of 180°C. and a pressure of 15 kg/cm² gauge by blowing in air such that the rate of flow of the air at the outlet would be 1500 cc/min., while stirring the reactants at high speed. The weight ratio of Co:Mn was constantly held at 95:5, but the total amount of catalyst added was varied. The decomposition loss, degree of discoloration and speed of TA formation were calculated as in Example 1. The results obtained are shown in Table 5.

Table 3

| Run | Catalyst | Temperature (°C.) | Decomposition loss (mmol/g) | Degree of discoloration (Hazen number) | Speed of TA formation (g/hr) |
|---|---|---|---|---|---|
| 3-a | Cobalt acetate | 170 | 11.28 | 400 | 7.6 |
| 3-b | do. | 200 | 26.74 | above 500 | 4.3 |
| 3-c | Manganese acetate | 150 | — | — | 0 |
| 3-d | do. | 180 | 25.81 | above 500 | 2.0 |
| 3-e | do. | 200 | 13.90 | do. | 5.2 |
| 3-f | do. | 220 | 29.83 | do. | 1.9 |

Table 5

| Run | Amount of catalyst added Co (mgr) | Mn (mgr) | Concentration of Co + Mn in oxdation reaction mixture | Decomposition loss (mmol/g) | Degree of discoloration (Hazen number) | Speed of TA formation (g/hr) | Remarks |
|---|---|---|---|---|---|---|---|
| 5-a | 7.6 | 0.4 | 0.0036 | 27.13 | above 500 | 2.8 | Comparison |
| 5-b | 11.4 | 0.6 | 0.0051 | 6.55 | 400 | 9.0 | Example |
| 5-c | 19 | 1 | 0.0084 | 3.47 | 200 | 15.7 | do. |
| 5-d | 38 | 2 | 0.0167 | 2.76 | 120 | 16.5 | do. |
| 5-e | 95 | 5 | 0.0420 | 3.32 | 100 | 15.0 | do. |
| 5-f | 285 | 15 | 0.128 | 5.17 | 150 | 11.6 | do. |
| 5-g | 570 | 30 | 0.256 | 8.07 | 300 | 8.8 | do. |
| 5-h | 1330 | 70 | 0.603 | 22.73 | 450 | 3.7 | Comparison |

EXAMPLE 4

Example 1 was repeated except that the reaction was carried out using instead of cobalt acetate and manganese acetate various other cobalt and manganese compounds as catalyst. The amounts of the catalysts added were, calculated as Co and Mn, respectively 47.5 and 2.5 milligrams. The results obtained are shown in Table 4, below.

EXAMPLE 6

A high pressure reactor equipped with an exhaust gas condenser, an agitator and a gas blowing-in inlet was charged with 2000 grams of paraxylene, 30 grams of paratoluic acid, 2 grams of cobalt acetate and 0.1 gram of manganese acetate, and the reaction was carried out for 3 hours by blowing in air at a temperature of 185°C. and a pressure of 15 kg/cm² gauge, while stirring the Table 4

| Run | Form of catalyst Cobalt | Manganese | Decomposition loss (mmol/g) | Degree of descoloration (Hazen number) | Speed of TA formation (g/hr) |
|---|---|---|---|---|---|
| 4-a | cobalt benzoate | manganese benzoate | 3.47 | 120 | 15.5 |
| 4-b | do. | manganese naphthenate | 3.46 | 100 | 14.8 |
| 4-c | cobalt acetylacetonate | do. | 3.61 | 120 | 15.1 |
| 4-b | do. | metallic manganese | 3.50 | 120 | 14.6 |
| 4-e | do. | manganese carbonate | 3.64 | 150 | 14.2 |
| 4-f | basic cobalt carbonate | manganese acetylacetonate | 4.20 | 200 | 12.8 |
| 4-g | finely divided metallic cobalt | manganese toluate | 4.01 | 150 | 13.9 | reactants at high speed. After completion of the reaction, the reaction mixture was allowed to cool, and the product was withdrawn and distilled to obtain an oxidation product from which the low boiling products such as unreacted paraxylene, etc., were removed.

This oxidation product in amounts of 100 grams each was placed in several flasks each equipped with a reflux condenser and was held for 3 hours at varying elevated temperatures as indicated in the following Table 6 at normal atmospheric pressure, while being gently stirred with a glass rod. Then, after the oxidation product was allowed to cool to 200°C., it was further cooled to 135°C., while adding dropwise 200 grams of paraxylene, following which the filtration of the product was conducted with a preheated glass filter. After filtration, the cake obtained was transfer to a flask and, after adding 200 grams of paraxylene and gently stirring for 10 minutes at 100°C., was again filtered with a glass filter. The so obtained cakes were dried, and the weight, content of impurities and color were determined. The results obtained are shown in Table 6.

other hand, the cake was again placed in a flask, to which was then added 500 grams of paraxylene followed by stirring gently for 10 minutes at 100°C. and again filtering with a glass filter. On drying the resulting cake, 45 grams of terephthalic acid was obtained. On the other hand, the filtrate was combined with the filtrate obtained previously and thereafter distilled to recover a major portion of the paraxylene as a fraction. The kettle residue obtained amounted to 277 grams. This kettle residue, which consisted predominantly of paratoluic acid and paraxylene, also contained such intermediates as paratolualdehyde, paraformylbenzoic acid and paramethylbenzyl alcohol, the by-products such as high boiling tarry substances, as well as traces of terephthalic acid and the cobalt and manganese catalysts. This kettle residue was again charged to the autoclave, and the oxidation reaction was carried out in the same manner as hereinbefore described. This was followed by a same after treatment to obtain 58 grams of terephthalic acid and 271 grams of a kettle residue containing the intermediates, etc. This procedure was Table 6

| Run | Holding temperature (°C.) | Amount of resulting TA (g) | Color of TA | Content of impurities (wt %) | | | Remarks |
|---|---|---|---|---|---|---|---|
| | | | | Paratolualdehyde | PTA | Paraformylbenzoic acid | |
| 6-a | 290 | 33 | yellowish brown | undetectable | 0.2 | 0.2 | Example |
| 6-b | 260 | 33 | slightly whitish yellow | do. | 0.1 | 0.1 | do. |
| 6-c | 240 | 33 | white | do. | 0.2 | 0.2 | do. |
| 6-d | 230 | 33 | do. | do. | 0.2 | 0.1 | do. |
| 6-e | 210 | The glass filter clogged during the first filtration and hense filtration was impossible. | | | | | Comparison |

EXAMPLE 7

A titanium autoclave of the same type as that used in Example 1 was charged with 200 grams of paraxylene, 5 grams of paratoluic acid, and cobalt acetate containing 47.5 milligrams of Co and manganese acetate containing 2.5 milligrams of Mn, following which the reaction was carried out for 3 hours at a temperature of 180°C. and pressure of 15 kg/cm² gauge by blowing in air such that the rate of flow of the air would be 1500 cc/min. at the outlet, while stirring the reactants at high speed. After completion of the reaction, the reaction mixture 272 grams was withdrawn, and the low boiling products consisting predominantly of unreacted paraxylene were removed by distillation. The remaining oxidation product was then charged to a flask equipped with a reflux condenser, where it was held for 3 hours at an elevated temperature of 240°C. under normal atmospheric pressure, while being gently stirred with a glass stirring rod, after which it was allowed to cool to 200°C. A further addition of paraxylene was made to the foregoing low boiling products consisting predominantly of unreacted paraxylene until its total was 500 grams. This was then added dropwise to the oxidation product previously allowed to cool to 200°C. and, while this dropping was being carried out, the mixture was cooled to 135°C., after which it was filtered with a glass filter, which had been heated in advance. At this time, the intermediates such as paratoluic acid, etc., were practically all recovered at the filtrate side. On the repeated two more times to obtain respectively 52 and 56 grams of terephthalic acid.

After thoroughly mixing the resulting terephthalic acid totaling 211 grams, a sampling was made and the contents of impurities were determined. The result was that only 0.1 percent by weight of paratoluic acid and 0.2 percent by weight of paraformylbenzoic acid were contained, and neither paratolualdehyde nor paramethylbenzyl alcohol could be detected. The terephthalic acid obtained was white.

EXAMPLE 8 (Comparison)

A 500-cc stainless steel autoclave equipped with a reflux condenser, a stirrer and a gas blowing-in inlet was charged with 200 grams of paraxylene and cobalt acetate and manganese acetate containing respectively Co and Mn in the amounts indicated in Table 8, and the reaction was carried out for 4 hours at temperature of 145°C. and a pressure of 6 kg/cm² gauge by blowing in air such that the rate of flow of the air at the outlet would be 800 cc/min., while stirring the reactants at high speed.

On the other hand, in an experiment in which only manganese acetate was charged as catalyst, only a slight absorption of oxygen was noted, and the oxidation reaction made hardly any progress. The speed of TA formation, decomposition loss and degre of discoloration were calculated as in Example 1, with the results shown in Table 8.

Table 8

| Run | Amount of catalyst added | | Speed of TA formation (g/hr) | Degree of discoloration (Hazen number) | Decomposition loss (mmol/g) |
| --- | --- | --- | --- | --- | --- |
| | CO (mgr) | Mn (mgr) | | | |
| 8-a | 50 | 0 | 4.5 | 100 | 5.98 |
| 8-b | 45 | 5 | 3.6 | 120 | 4.33 |
| 8-c | 12.5 | 37.5 | 2.1 | 160 | 8.60 |
| 8-d | 0 | 50 | — | — | — |

What I claim is:

1. In the process for the preparation of terephthalic acid by oxidizing paraxylene and/or paratoluic acid with a molecular oxygen-containing gas in the liquid phase, the improvement which consists essentially of carrying out said oxidation reaction 1. in the substantial absence of a lower fatty acid or halogen compound;
  2. in the presence of a catalyst consisting essentially of cobalt or an organic cobalt compound and manganese or an organic manganese compound, which are at least partially soluble in the reaction mixture, the sum total of cobalt and manganese calculated as metals, present in the total oxidation reaction mixture being in the amount of 0.005 to 0.5 percent by weight, the weight ratio, calculated as metals, of the cobalt and manganese being 99.8:0.2 to 20:80; and
  3. at a temperature in the range of 150° to 220°C.

2. The process of claim 1 in which paraxylene in the liquid phase is oxidized with a molecular oxygen-containing gas to prepare the terephthalic acid.

3. The process of claim 1 wherein said oxidation reaction is carried out in the substantial absence of a solvent or a diluent.

4. The process of claim 1 in which said sum total of cobalt and manganese is 0.007 to 0.2 percent by weight.

5. The process of claim 1 in which the ratio, calculated as metals, of the cobalt and manganese contained in the total oxidation reaction mixture is 99.5:0.5 to 50:50.

6. The process of claim 1 wherein said oxidation reaction is carried out at a temperature in the range of 160° to 200°C.

7. The process of claim 1 wherein the oxidation reaction mixture is adjusted such that the content of the terephthalic acid in it does not exceed 60 percent by weight.

8. A process for separating terephthalic acid, which consists essentially of submitting the oxidation reaction mixture obtained by the process of claim 1 to heat treatment at an elevated temperature exceeding 220°C., and thereafter separating the solid terephthalic acid from the oxidation reaction mixture.

9. The process of claim 8 wherein said elevated temperature is in the range of from 230° to 270°C.

10. The process of claim 8 wherein said elevated temperature treatment is carried out after removing the unreacted paraxylene contained in the oxidation reaction mixture.

11. The process of claim 8 wherein said oxidation reaction mixture is submitted to the elevated temperature treatment for a period ranging from 10 minutes to 50 hours.

12. The process of claim 8 wherein, after submitting said oxidation reaction mixture to the elevated temperature treatment, a solvent is added thereto and thereafter the solid terephthalic acid is separated.

13. The process of claim 12 wherein said solvent is paraxylene.

* * * * *